(12) United States Patent
Warinner et al.

(10) Patent No.: US 6,416,044 B1
(45) Date of Patent: Jul. 9, 2002

(54) COMPRESSIBLE FLUID SUSPENSION SYSTEM

(75) Inventors: Derek K. Warinner, New Haven; Robert W. Pope, Fort Wayne, both of IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/571,961

(22) Filed: May 16, 2000

(51) Int. Cl.[7] .................................................. F16F 9/04
(52) U.S. Cl. ............................ 267/64.19; 267/64.27; 280/124.1
(58) Field of Search .................... 267/64.11, 64.16, 267/64.19, 64.23, 64.25, 64.27; 280/5.515, 124.1, 124.109, 124.11, 124.151, 6.15

(56) References Cited

U.S. PATENT DOCUMENTS

| | | | | | |
|---|---|---|---|---|---|
| 2,902,291 | A | * | 9/1959 | Walker | 280/6.159 |
| 3,782,294 | A | * | 1/1974 | Sundby | 105/182 R |
| 4,206,934 | A | * | 6/1980 | McKee | 280/5.515 |
| 4,580,809 | A | * | 4/1986 | Leaf | 280/124.116 |
| 4,687,222 | A | * | 8/1987 | Chalmers | 280/683 |
| 4,705,294 | A | * | 11/1987 | Raidel | 267/31 |

* cited by examiner

*Primary Examiner*—Pam Rodriquez
(74) *Attorney, Agent, or Firm*—Jeffrey P. Calfa; Neil T. Powell; Dennis Kelly Sullivan

(57) ABSTRACT

The invention is a compressible fluid suspension system using a compressible fluid spring, like an air spring, communicating with a reservoir for auxiliary volume of compressible fluid. The reservoir is located within an axle.

15 Claims, 3 Drawing Sheets

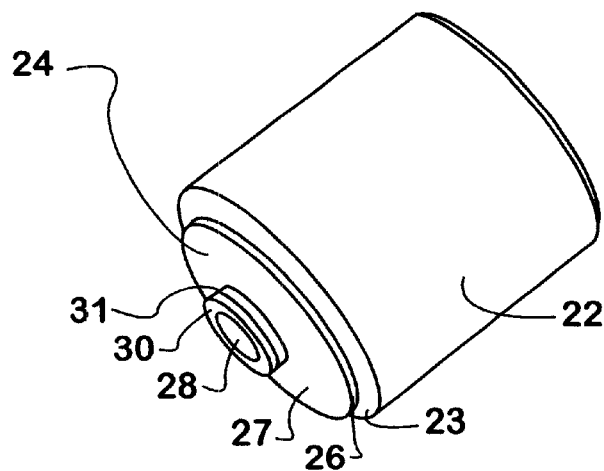
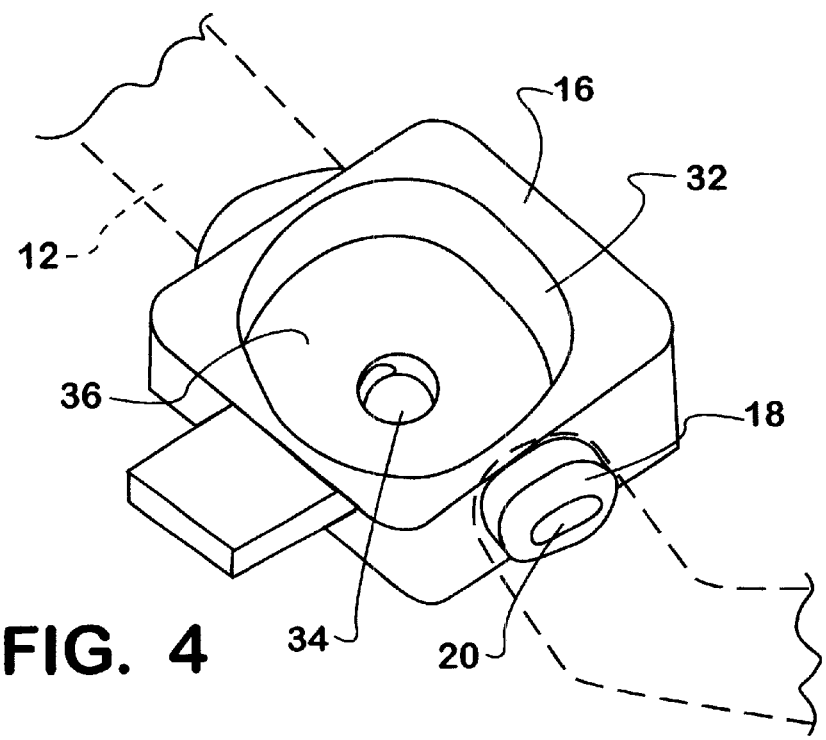

COMPRESSIBLE FLUID SUSPENSION SYSTEM

BACKGROUND OF THE INVENTION

1. Field of the Invention

The present invention relates to a fluid suspension system for a vehicle.

2. Description of the Prior Art

Vehicle suspensions isolate vehicles and their loads from jarring movements or shocks resulting from driving over rough roads and terrain. Isolating shocks reduces both wear and tear on the vehicle body as well as stress on the driver and cargo from shocks transmitted from the wheels to the vehicle body. Suspensions cushion the vehicle by absorbing energy impulses from shocks and vibrations, converting the movements into slower, gentler movements of the vehicle body and dissipating the energy impulses in the moving vehicle body in an unobtrusive way.

The shock or energy converting elements of suspension systems are springs. Springs are commonly associated with and adjacent to each wheel of the vehicle to cushion the vehicle body. An upward shock applied to a wheel is temporarily absorbed by the compression of the adjacent spring. The shock is then transmitted by the spring to the vehicle body as a upward force, resulting in a relatively gentle upward movement of the vehicle. The vehicle body then settles back on the spring which compresses and returns energy to the spring. Shock absorbers dissipate this energy by converting the energy to heat by friction.

A spring must have a sufficient weight bearing capacity to support the vehicle. A spring must carry a vehicle's maximum load while preventing the transmission of vibration and shock from the wheels to the frame, especially when the vehicle is empty. The spring rate is the relationship between load and spring deflection defined as the load in pounds divided by the deflection of the spring in inches. A soft spring has a low spring rate and deflects a greater distance under a given load. Therefore the selection of a particular spring frequently forces a compromise between choosing a high spring rate for superior handling and low spring deflection and a low spring rate to assure a smooth, soft ride.

Metal springs generate force by moving or deflecting from an at rest position. For compressive springs, such deflection occurs by compressing the spring. Metal springs have a specific deflection. A metal spring has a limit to its deflection and as a result, a limit to its weight bearing capacity. By increasing the spring rate or stiffness of the metal spring, the carrying capacity of the spring increases for a fixed travel or deflection of the spring. However, increasing the spring rate reduces the spring's ability to absorb energy from road shocks giving a firmer ride. Road noise and abrupt shocks will increasingly be transmitted to the vehicle body and subsequently, the driver and cargo.

Not all springs are metal. Air springs have a number of advantages over metal springs and are increasingly popular. Rather than having a specific deflection like metal springs, air springs hold a load at a given height through the force developed from increased pressure within the spring. For a motor vehicle, the compromise is less drastic between choosing a high spring rate for superior handling and low spring deflection travel and a low spring rate to assure a smooth, soft ride. The advantages of air springs for trucks and buses is greater than for automobiles, due to the widely varying loads carried by trucks and buses.

Rather than merely being a reflection of load to deflection, spring rates in air springs relate to pressure in the air spring and air spring volume. The force required to deflect the air spring increases with greater deflection, because the air is compressed into a smaller space which builds up pressure and resists further deflection. The spring rate can be adjusted to suit conditions, such as load, road conditions or the driver's personal preference and maintained during various weather conditions. Air spring suspensions can be built which adjust air pressure in the springs to assure that the vehicle always rides at the same height. Thus, the spring rate of an air spring can be adjusted to support any load at a fixed deflection.

Such flexibility does not come without a price, however. If spring rates are adjusted as a function of load, especially to maintain a constant vehicle height, the vehicle's ride becomes firmer as load increases. For example, it is frequently desirable to have the floor of a vehicle, such as a trailer, a bus or a van, as low as possible. The lower operating height of a low cargo floor, for instance, efficiently transports cargo by providing more useable, internal space for given exterior dimensions. Also, a low floor placed close to the road surface, such as a bus, allows easier access to the vehicle. On buses, especially airport buses where a low ride height for quick and easy loading of passengers is desirable, the frequent presence of standing passengers dictates a smooth ride for passenger safety. To compensate for the increasing passenger load, however, the spring rate increases causing a firmer, less smooth ride. To maintain a smooth ride for passengers despite increasing loads, the volume of the air spring is increased.

One way to avoid a dependency of spring rate to load in air springs has been to introduce an external fluid reservoir in fluid communication with the air spring system. Communication between the air spring and the reservoir may be opened full time or adjusted as required by conditions. When a change in spring rate is desired, the volume reservoir connected to the air spring chamber temporarily alters the apparent volume of the air spring and thus changes the spring rate. This alteration reduces the spring rate while sufficiently inflating the spring to support the load at the desired height.

The prior art external volume reservoirs have two major disadvantages. First, they are too bulky and space intensive to be located close to the air spring, especially when the floor height is low and such reservoirs are more valuable. Second, locating the volume reservoir at some distance decreases or nearly eliminates the reservoir's advantages by introducing air flow restrictions and friction in the conduit connecting the distant reservoir to the air spring. These restrictions decrease the available volume and the actual spring rate changes from using the air spring with an external reservoir.

Besides prohibiting the use of bulky reservoirs near the air spring, lower operating heights also constrain air spring suspensions by limiting the height at which the air spring operates. Low operating heights limit the maximum volume of air available to compress in lobe air springs, thus preventing the use of taller or "softer" air springs. The lower operating heights also limit the compressed height of the air spring. A suspension with a low operating height and a high bump or jounce travel requirement is limited to the use of a short air spring with a short piston. This reduces the benefit of joining the piston air volume with the rubber section air volume.

The prior art has attempted to address the reservoir problem by using an air spring with a hollow piston. The hollow piston serves as a reservoir to increase the apparent volume of the air spring. This air spring uses the air volume in the piston by exchanging air between the air volume in the rubber section of the air spring and the air volume in the piston to provide an air spring with reduced stiffness. Unfortunately, by reducing the size of the air spring for low operating heights, this air spring does not provide a sufficient reservoir of air between the piston and the rubber section to sufficiently cushion a ride in a variety of vehicle and road conditions.

Similarly, U.S. Pat. No. 4,629,170 attempts to address the reservoir problem by using a dual action air spring with two rubber sections. The '170 air spring changes the spring rate without changing the load bearing capacity by exerting compression or extension forces in the two rubber sections. Unfortunately, the patent does not address the low operating height constraints. The height of the air spring is still too "tall" to fit in a low suspension system and the amount of air is insufficient to cushion a ride for a variety of conditions.

Therefore, one object of the invention is to provide a suspension system for a vehicle. Another object of the invention is to provide a suspension system for vehicles with low operating heights. Still another object is to provide a reservoir of air located near the air spring to avoid the dependency of spring rate to load in an air spring system. It is another object to provide such a system while maintaining low spring rates over all vehicle loads to assure a soft or smooth riding vehicle.

SUMMARY OF THE INVENTION

According to the invention there is provided a compressible fluid suspension system for a vehicle. The compressible fluid suspension system includes an axle with a reservoir in fluid communication with a compressible fluid spring, such as an air spring. The reservoir provides the spring with an auxiliary volume of compressible fluid. At least part of the axle itself serves as the reservoir for the compressible fluid spring. The axle has a spring interface connecting the axle with the compressible fluid spring. This spring interface is in fluid communication with the reservoir and the spring.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a perspective view of a compressible fluid spring of the invention;

FIG. 4 is a perspective view of a spring interface with phantom lines indicating a tubular axle;

DETAILED DESCRIPTION OF THE INVENTION

Figure 1:
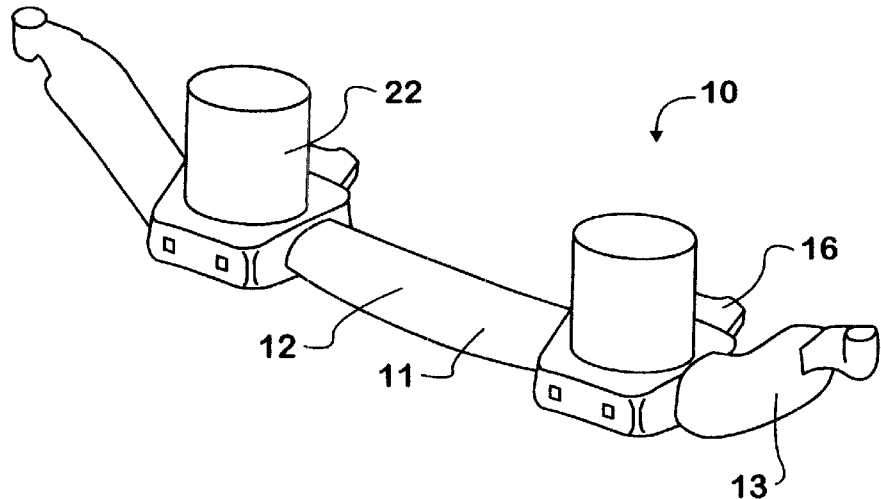
FIG. 1 is a perspective view of a compressible fluid suspension system of the invention.
Figure 2:
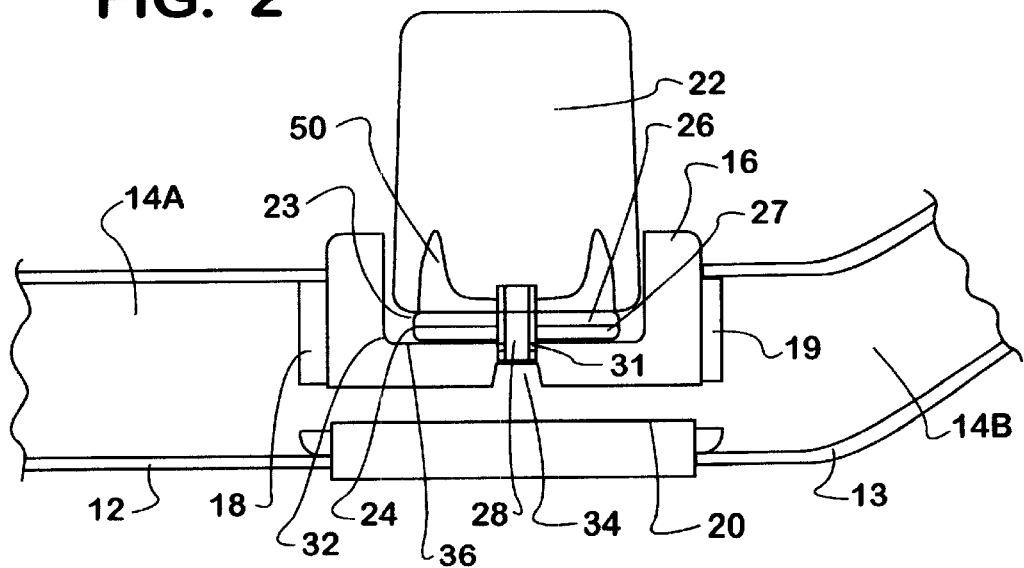
FIG. 2 is a longitudinal view of part of the invention shown in FIG. 1.

In a compressible fluid suspension system for vehicles shown in the Figures where like reference numerals refer to like components, a compressible fluid spring communicates with one or more reservoirs. Turning to the compressible fluid suspension system 10 shown in FIGS. 1–4, a compressible fluid spring 22, preferably an air spring, communicates with reservoirs 14A, 14B, located within axle sections 12, 13 of axle 11. At least part of axle sections 12, 13 is hollow or tubular to serve as reservoirs 14A, 14B. Spring interface 16 connects axle 11 with spring 22, and can connect axle sections 12, 13 as well. Spring interface 16 can be integral with the axle or a separate piece connected to the axle sections with axle connectors 18, 19 extending laterally from spring interface 16, such as a knuckle, spindle, and the like. Communication port 20 in the spring interface 16 allows the flow of fluid between axle reservoirs 14A, 14B and spring interface 16. Axle connector 18 contains at least part of communication port 20.

The compressible fluid spring 22 shown in FIG. 3 is preferably a lobed air spring having a piston 50 to exchange air with the rubber section. Integral with or attached to the bottom section 23 of spring 22, such as by attachment to piston 50, is spring seal 24. Spring seal 24 inhibits fluid leakage from the suspension system. Preferably, spring seal 24 has a spring interface plate 26, more preferably spring interface plate 26 has a mounted plate seal 27, such as a face seal, gasket and the like. Spring seal 24 has an opening 28 extending through spring seal 24 to the spring 22 to allow the flow of fluid between spring interface 16 and spring 22. Preferably, the opening 28 is within a pilot cylinder 30 extending from the spring interface plate 26 opposite spring 22. The pilot cylinder 30 can be attached or integral with the spring interface plate 26 and can have a mounted cylinder seal 31, such as O-rings, wiper seals and the like.

Turning to FIG. 4, spring interface 16 has a sealing surface 36 for engaging spring seal 24 of spring 22. Sealing surface 36 can be within a spring interface recess 32 of spring interface 16. Spring 22 with spring seal 24 nestles within spring interface recess 32. Spring interface 16 has a pilot bore 34 extending from sealing surface 36 to communication port 20 to exchange fluid between nearby axle reservoirs 14A, 14B and spring 22. Pilot bore 34 receives at least part of pilot cylinder 30 and any cylinder seals. Preferably, sealing surface 36 is flat and surrounds pilot bore 34 to engage spring seal 24, such as the plate seal and the interface plate.

When assembled, spring 22 rigidly fastens to the axle. Spring seal 24 on the bottom of the spring 22 fits within spring interface recess 32, preferably by aligning the opening 28 with pilot bore 34 and placing spring interface plate 26 flush with the sealing surface 36. Preferably, the pilot cylinder with any cylinder seals is inserted into the pilot bore for an easy alignment. The inserted pilot cylinder should fit tightly within the pilot bore to open communication between the spring and the axle reservoir without fluid leakage. The seals on the interface plate engage the sealing surface to also reduce any fluid leakage.

Figure 5:
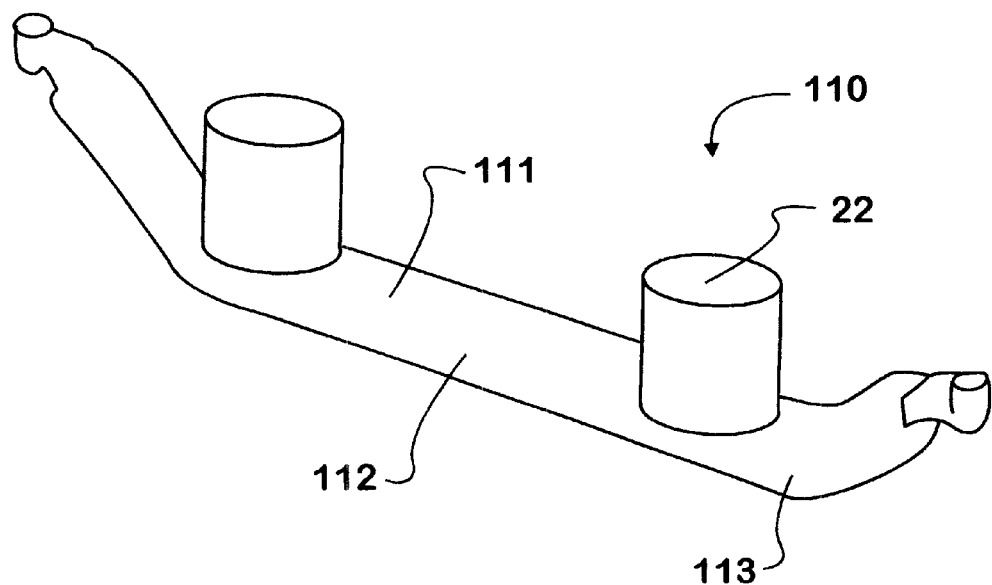
FIG. 5 is a perspective view of another compressible fluid suspension system of the invention.
Figure 6:
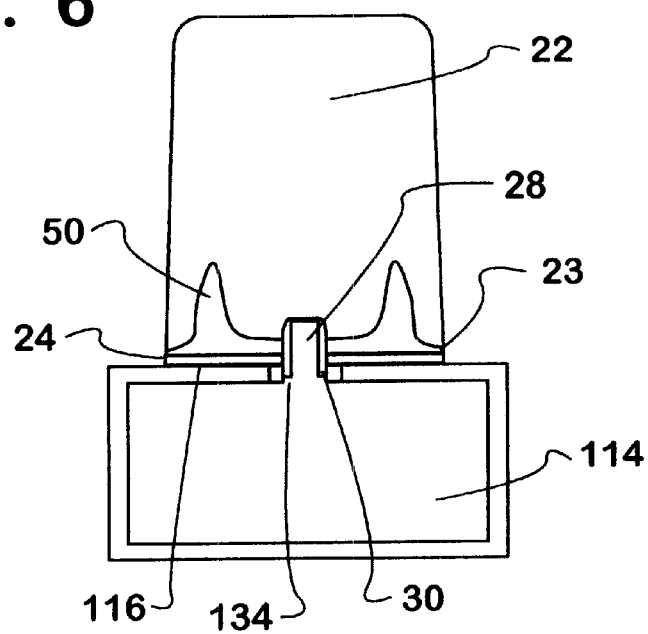
FIG. 6 is a cross-sectional view of part of the invention shown in FIG. 5.

In the embodiment shown in FIGS. 5 and 6, compressible fluid spring 22 of compressible fluid suspension system 110 communicates with reservoir 114, located within at least part of axle 111, typically within axle sections 112, 113. Axle 111 can be a sealed boxed beam axle. Axle 111 has a spring interface 116 which engages spring 22. Spring interface 116 contains pilot bore 134 into which pilot cylinder 30 and any cylinder seals of spring 22 fits. Spring interface 116 can be a flat portion of axle 111. Spring interface 116 may also have an additional sealing surface, such as a face plate, gasket, and the like surrounding pilot bore 134 to allow spring 22 to rigidly attach to axle 111. Fluid typically flows through pilot bore 134 from reservoir 114 through opening 28 of pilot cylinder 30 into spring 22.

Rather than having one reservoir in the axle connecting two springs to the same volume, two sealed reservoirs can be made with a dividing plate in the center of the axle reservoir. The use of two closed reservoirs allows the separate adjustment of pressure in each spring to match the placement and weight of the load in the vehicle. In addition, baffles and valves can be located in the reservoir to control or direct fluid flow, or to selectively open and close connections between one or more reservoirs and spring 22.

Pressure within the suspension system is easily altered by standard methods. Typically air pressure is changed by feeding and exhausting air via ports located in the air spring top plate.

The axle can have cast or machined sections for the axle connector and the spring interface. The axle is manufactured to prevent the leakage of fluid from the axle and reservoir, such as a careful welding process. The axle can be made from welded plate, if desired.

The compressible fluid suspension system of the invention has a number of advantages. The suspension system is well suited for vehicles with low operating heights. Because the spring can nestle within a recess in the axle, softer springs with increased compressed spring heights can be used for a softer ride. A softer ride reduces the wear and tear on the vehicle and cargo and reduces driver fatigue. The inclusion of nearby reservoirs gives low profile springs a much larger apparent volume for a softer ride. Since the reservoirs are part of the axle, the suspension system does not require the use of a bulky reservoir while allowing the use of low profile springs fitting within the low operating height.

The location of the reservoir is another advantage. Because the reservoir is near the spring, the problems associated with reservoirs distant from the spring are eliminated. The use of seals, such as the spring interface plate, provides a non-restrictive fluid passage to allow the spring to exchange fluid with the reservoir located in the nearby axle. Therefore, the decrease in the spring rate differential found when using distant reservoir systems is eliminated.

The compressible fluid suspension system of the invention is independent of the axle shape and the number or arrangement of the air springs which is a further advantage. The system readily adapts to a variety of designs. This allows the flexibility to use the system for a variety of vehicles and in a variety of different locations on the vehicle, for example, the front or rear axle. Furthermore, when using air for the compressible fluid, the axle weighs less than a solid axle, resulting in a more energy efficient vehicle.

While the invention is shown in only one of its forms, it is not thus limited but is susceptible to various changes and modifications without departing from the spirit and scope of the invention.

What is claimed is:

1. An apparatus for a compressible fluid suspension system for a vehicle comprising:
    an axle;
    a spring interface in the axle adapted to fit a compressible fluid spring; and
    a reservoir located within the axle in fluid communication with the spring interface.

2. An apparatus for a compressible fluid suspension system for a vehicle of claim 1, further comprising:
    a communication port in the spring interface communicating with the reservoir.

3. An apparatus for a compressible fluid suspension system for a vehicle of claim 2, further comprising:
    an axle connector extending laterally from the spring interface toward the axle.

4. An apparatus for a compressible fluid suspension system for a vehicle of claim 2, further comprising:
    a sealing surface on the spring interface; and
    a pilot bore extending from the sealing surface to the communication port.

5. An apparatus for a compressible fluid suspension system for a vehicle comprising:
    an axle;
    a spring interface in the axle adapted to fit a compressible fluid spring;
    a reservoir located within the axle in fluid communication with the spring interface;
    a communication port in the spring interface communicating with the reservoir;
    a recess within the spring interface;
    a sealing surface within the recess; and
    a pilot bore extending from the sealing surface to the communication port.

6. A compressible fluid suspension system for a vehicle comprising:
    an axle;
    a compressible fluid spring; and
    a reservoir located within the axle in fluid communication with the compressible fluid spring.

7. A compressible fluid suspension system for a vehicle of claim 6, further comprising:
    a spring interface in the axle in fluid communication with the compressible fluid spring and the reservoir.

8. A compressible fluid suspension system for a vehicle of claim 7, further comprising:
    a recess within the spring interface.

9. A compressible fluid suspension system for a vehicle of claim 7, further comprising:
    a spring seal for sealingly engaging the compressible fluid spring with the spring interface.

10. A compressible fluid suspension system for a vehicle of claim 9, further comprising:
    a sealing surface on the spring interface; and
    a pilot bore extending from the sealing surface to the a communication port.

11. A compressible fluid suspension system for a vehicle of claim 9, wherein the spring seal further comprises:
    a spring interface plate; and
    an opening in the spring interface plate in fluid communication with the compressible fluid spring.

12. A compressible fluid suspension system for a vehicle comprising:
    an axle;
    a compressible fluid spring;
    a reservoir located within the axle in fluid communication with the compressible fluid spring;
    a spring interface in the axle in fluid communication with the compressible fluid spring and the reservoir;
    a recess within the spring interface;
    a sealing surface within the recess; and
    a pilot bore extending from the sealing surface to a communication port.

13. A compressible fluid suspension system for a vehicle comprising:

an axle;

a compressible fluid spring;

a reservoir located within the axle in fluid communication with the compressible fluid spring;

a spring interface in the axle in fluid communication with the compressible fluid spring and the reservoir;

a spring seal for sealingly engaging the compressible fluid spring with the spring interface;

a spring interface plate;

an opening in the spring interface plate in fluid communication with the compressible fluid spring; and a pilot cylinder extending from the spring interface plate opposite the compressible fluid spring and containing at least a portion of the opening.

14. A compressible fluid suspension system for a vehicle of claim 13, further comprising:

plate seats mounted to the spring interface plate.

15. A compressible fluid suspension system for a vehicle of claim 13, further comprising:

cylinder seals mounted to the pilot cylinder.

* * * * *